(12) United States Patent
Ying et al.

(10) Patent No.: US 7,729,140 B2
(45) Date of Patent: Jun. 1, 2010

(54) SAMPLING METHOD WITH ADJUSTING DUTY RATIOS

(75) Inventors: Jian-Ping Ying, Shanghai (CN); Ai-Bin Qiu, Shanghai (CN); Jian-Hong Zeng, Shanghai (CN); Zi-Ying Zhou, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 281 days.

(21) Appl. No.: 12/044,392

(22) Filed: Mar. 7, 2008

(65) Prior Publication Data
US 2008/0238374 A1    Oct. 2, 2008

(30) Foreign Application Priority Data
Mar. 26, 2007    (TW) .............................. 96110430 A

(51) Int. Cl.
    *H02M 1/12*    (2006.01)
    *H02M 1/14*    (2006.01)
(52) U.S. Cl. ........................... 363/41; 363/40; 323/282; 323/284
(58) Field of Classification Search ............... 363/40, 363/41; 323/282, 284
    See application file for complete search history.

(56) References Cited
    U.S. PATENT DOCUMENTS 4,772,996 A *   9/1988  Hanei et al. ................... 363/41
    5,068,777 A *  11/1991  Ito ............................... 363/97
    5,166,870 A *  11/1992  Shimizu et al. .............. 363/41
    6,023,417 A *   2/2000  Hava et al. ................... 363/41
    2003/0142517 A1*  7/2003  Furukawa et al. ............ 363/37

OTHER PUBLICATIONS

Van De Sype, David M. et al. "A Sampling Algorithm for Digitally Controlled Boost PFC Converters" Electrical Energy Laboratory (EELAB), EESA, Ghent University, Gent, Belgium 2002 IEEE, pp. 1693-1698.
Van De Sype, David M. et al. "Sampling Algorithm for Small Input Current Distortion in Digitally Boost PFC Converters" Electrical Energy Laboratory (EELAB), EESA, Ghent University, Gent, Belgium EPE 2003, pp. 1-9.

* cited by examiner

*Primary Examiner*—Bao Q Vu
(74) *Attorney, Agent, or Firm*—Volpe and Koenig, P.C.

(57) ABSTRACT

A sampling method with adjusting duty ratios is provided and includes the following steps. A first working pulse signal which has a pulse-width duty ratio D in a switching period $T_s$ is provided. A first adjusting period comprising first N successive switching periods of the first working pulse signal is set, wherein N is a natural number larger than 1. A second working pulse signal which has second N successive switching periods with their corresponding pulse-width duty ratio $D_1, D_2, \ldots, D_N$ to drive the switch in the converter circuit is provided and the measured signal is generated, wherein the sum of $D_1, D_2, \ldots, D_N$ substantially equals to N·D and the second N successive switching periods constitute a second adjusting period.

16 Claims, 10 Drawing Sheets

SAMPLING METHOD WITH ADJUSTING DUTY RATIOS

FIELD OF THE INVENTION

The present invention relates to a sampling method by adjusting duty ratios, and more particularly to a sampling method under the condition that the duty ratios are small.

BACKGROUND OF THE INVENTION

There are many kinds of methods for sampling a current, such as by using a Hall sensor, inserting a sampling resistor in a circuit, using the body resistance of a transistor switch, using a current transformer, and so on. Each of these methods has its advantages and disadvantages.

Though Hall sensor can be used to sample current accurately, it is still expensive and big in volume for modern power supply, e.g. telecom or server power supply, which requires low cost and high power density.

Using the resistor for sampling the current is very simple. However, the resistor itself generates power loss especially on the occasion of large output current, which decreases the efficiency of the whole circuit.

Using the body resistance of the transistor switch is another simple method for sampling the current, which can not only decrease the loss but also reduce the volume. However, the body resistance of the transistor switch changes a lot according to the variation of its temperature, which affects the precision of sensed current.

Comparatively speaking, using the current transformer for sampling the current has the advantages of low cost, low loss and nicety, which makes it widely used in the modern engineering applications. In general, current transformers are connected in series with the switches in respective branch circuits for obtaining the currents of the branch circuits, thus various current control methods can be performed conveniently. Under the average current control method, the currents of the respective branch circuits will be added up for obtaining an average value of a main branch current. Thus the number of the current transformers is increased under this control method, which reduces the power density of the whole circuit.

As an example, FIG. 1 is a schematic diagram showing a conventional power factor correction circuit, wherein the switch current is sampled through a current transformer (CT). A Y-connection circuit electrically connected by an inductor L1, a switch S1, and a diode D1 is shown in FIG. 1. The switch S1 is a power transistor, such as a metal-oxide-semiconductor field effect transistor, where the current $i_{S1}$ flows therethrough. The current $i_{L1}$ flows through the inductor L1. And the current $i_{D1}$ flows through the diode D1. If the current $i_{S1}$ and the current $i_{D1}$ are added up under the current average control method for obtaining the average of the current $i_{L1}$, two current transformers have to be used so as to satisfy the requirement. For an interleaving power factor correction system, the number of required current transformers should be more.

Under digital control, the above-mentioned problem can be easily solved. Give an example on FIG. 1. When the power factor correction circuit 81 operates on the continuous conduction mode, the average value of the current $i_{L1}$ in one switching period Ts is equal to the midpoint current of a pulse of the current $i_{S1}$ or that of a pulse of the current $i_{D1}$ in that switching period. Therefore, as long as the midpoint current of the pulse of the current $i_{S1}$ or that of the pulse of the current $i_{D1}$ in the switching period can be obtained through sampling, the average of the current $i_{L1}$ in the corresponding switching period can be obtained. Relevant contents are described in the following two documents "A Sampling Algorithm for Digitally Controlled Boost PFC Converters", David M. Van de Sype, Koen De Gusseme, etc. PESC2002 and "Sampling algorithm for small input current distortion in digitally controlled boost PFC converters", David M. Van de Sype, Koen De Gusseme, etc, EPE2003. Under the digital control, sampling the midpoint current of the pulse of the current $i_{S1}$ is very easy to be implemented.

And it is illustrated in FIG. 1 that the average current in one switching cycle is sampled at the midpoint time of the pulse of the current $i_{S1}$. Relevant devices are a digital signal processor (DSP) 21, a driver 22, the switch S1, and a current transformer CT1. According to the relationship between the input voltage $V_{in}$ and the output voltage $V_o$ of the power factor correction circuit 81, the DSP 21 obtains the pulse-width duty ratio D by computation. The pulse-width duty ratio D denotes a ratio of the turn-on duration to the switching period $T_s$ for the switch S1. According to the pulse-width duty ratio D and the switching period $T_s$ of the power factor correction circuit 81, the DSP 21 produces a working pulse signal $V_{p,n}$, which is composed of a series of pulses.

The driver 22 coupled to the DSP 21 receives the working pulse signal $V_{p,n}$ and generates a driving pulse signal $V_{g1}$ which comprises a plurality of driving pulses. The switch S1 coupled to the driver 22 receives the driving pulse signal $V_{g1}$. Because of the switch S1 being on in each driving pulse, a current pulse corresponding to the each driving pulse in the current $i_{S1}$ is produced. The current transformer CT1 connected in series with the switch S1 samples the midpoint current at the midpoint time of the pulse of the current $i_{S1}$ and sends the sampled signal to DSP 21.

FIG. 2 shows the corresponding waveforms of the driving pulse signal $V_{g1}$, the current $i_{S1}$, and the current $i_{L1}$ in the circuit 81 in FIG. 1 when sampling the average current without any response delay. As shown in FIG. 2, supposing that the working pulse signal $V_{p,n}$, the driving pulse signal $V_{g1}$, and the current $i_{S1}$ and $i_{L1}$ have no any response delay, that is, there is no phase difference between them, thus the sampled midpoint current of each pulse of $i_{S1}$ through the current transformer CT will exactly represent the average of $i_{L1}$ in the corresponding pulse when at the continuous conduction mode or critical conduction mode.

In fact, there is a response delay time $T_{r1}$ between a rising edge of each pulse of the working pulse signal $V_{p,n}$ and that of a corresponding pulse of $i_{S1}$, wherein the response delay time $T_{r1}$ is the sum of the response delay time $T_{r2}$ (not shown), which is the delay time between a rising edge of each pulse of $V_{p,n}$ and that of a corresponding pulse of $V_{g1}$, and the response delay time $T_{r3}$ (not shown), which is the delay time between a rising edge of each pulse of $V_{g1}$ and that of a corresponding pulse of $i_{S1}$. And FIG. 3 shows the corresponding waveforms of the working pulse signal $V_{p,n}$, the driving pulse signal $V_{g1}$ and the current $i_{s1}$ in the circuit 81 in FIG. 1 when sampling the average current with response delay, wherein $T_{r3}$ is assumed to be zero for simplicity.

In general, a sampling time point controlled by the DSP 21 is set at the point t1 shown in FIG. 3, that is, the midpoint time of each pulse of $V_{p,n}$. Because of the presence of the response delay time $T_{r1}$, there is error between the sampling value, of the current $i_{S1}$ and the corresponding real average of the current $i_{L1}$. Generally speaking, the sampling error due to the response delay affects the average current of $i_{L1}$ little when duty ratio D is large.

According to the formula $D=1-V_{in}/V_o$ for the boost power factor correction circuit 81 shown in FIG. 1, wherein $V_{in}$ is the input voltage and $V_o$ is the output voltage, the pulse-width duty ratio D decreases with the increase of the input voltage $V_{in}$; that is, the pulse-width of the working pulse signal $V_{p,n}$ decreases therein. When the pulse-width duty ratio D decreases to a certain degree, a sampling error occurs that the switch S1 does not turn on at the midpoint time of a pulse of the working pulse signal $V_{p,n}$ due to the response delay. Please refer to FIG. 4, which shows the corresponding waveforms of the working pulse signal $V_{p,n}$, the driving pulse signal $V_{g1}$, the current $i_{S1}$ and $i_{L1}$ in the circuit 81 in FIG. 1 with sampling errors due to the response delay at a high input voltage. As shown in FIG. 4, the pulse-width of the working pulse signal $V_{p,n}$ becomes narrower. Thus, due to the same response delay time $T_{r1}$, the time t2, at which the switch S1 turns on, is after the sampling time t1, so that a sampling error is formed, with the sampled value of the current is zero, but in fact the average current is not zero.

Due to the sampling error, a control failure is produced. FIG. 5 shows the corresponding waveforms of the input voltage $V_{in}$ and an input current $I_{in}$ (not shown) in the circuit 81 in FIG. 1 due to the sampling errors, wherein the input current $I_{in}$ is produced by filtering the current $i_{L1}$. In FIG. 5, the input voltage $V_{in}$ is 265 Vac, the output voltage $V_o$ is 380V, and the output power is 650 W. The waveform of the input current $I_{in}$ has a very serious distortion and a large spike near each peak of the input voltage $V_{in}$. Because of the small pulse-width duty ratio D near the each peak of the input voltage $V_{in}$ and the response delay time $T_{r1}$, the sampled current information is incorrect, which makes the input current $I_{in}$ have the very great spike. This phenomenon becomes more serious when the input voltage $V_{in}$ is higher.

FIG. 6 shows another conventional power factor correction circuit with the diode current is sampled through a current transformer. The circuit 82 in FIG. 6 is a variation of the circuit 81 in FIG. 1. In FIG. 1, the current transformer CT1 connected in series with the switch S1 is for sampling the current $i_{S1}$ while in FIG. 7, a CT1 is connected in series with the diode D1 for sampling the current $i_{D1}$.

And the relevant devices are a DSP 21, a driver 22, a switch S1, a diode D1, and the current transformer CT1. The pulse-width duty ratio D represents the relationship between an input voltage $V_{in}$ and an output voltage $V_o$ of the power factor correction circuit 82, which is $D=1-V_{in}/V_o$. According to the relation of the D, the DSP 21 obtains the pulse-width duty ratio D by computation. As in one switching period $T_s$ there is the complementary relation between the pulse duration of the current $i_{S1}$ and the pulse duration of the current $i_{D1}$, the pulse-width duty ratio D is converted as a pulse-gap-width duty ratio $D_{nu}$, the computing formula of which is $D_{nu}=V_{in}/V_o$, wherein the pulse-gap-width duty ratio $D_{nu}$ denotes a ratio of the pulse duration period of the current $i_{D1}$ to the switching period $T_s$. According to the pulse-width duty ratio D and the switching period $T_s$ of the power factor correction circuit 82, the DSP 21 produces a working pulse signal $V_{p,n}$, and there is a pulse-gap between two adjacent pulses in the working pulse signal $V_{p,n}$.

The driver 22 coupled to the DSP 21 receives the working pulse signal $V_{p,n}$ for producing a driving pulse signal $V_{g1}$ having a plurality of driving pulses. The switch S1 coupled to the driver 22 receives the driving pulse signal $V_{g1}$. Because of the switch S1 being on in each driving pulse, a pulse corresponding to the each driving pulse in the current $i_{S1}$ is produced. The diode D1 is coupled to the switch S1. As the turn-on and off of the switch S1, the sum of the pulse duration period of the current $i_{S1}$ and $i_{D1}$ equals to or extremely approaches the switching period $T_s$ here. The current transformer CT1 connected in series with the diode D1 samples the midpoint current at the midpoint time of the pulse of the current $i_{D1}$ and sends the sampled signal to the DSP 21. Under the continuous conduction mode and critical conduction mode, the average current of the $i_{L1}$ flowing through the inductor L1 in one switching period equals to the midpoint current of the pulse of the current $i_{D1}$ in that switching period.

Please refer to FIG. 7, which shows the corresponding waveforms of the working pulse signal $V_{p,n}$, the driving pulse signal $V_{g1}$, the current $i_{D1}$, and the current $i_{L1}$ with sampling errors due to the response delay at a low input voltage. As shown in FIG. 7, each pulse-gap duration period in the working pulse signal $V_{p,n}$ corresponds to a pulse duration in the current $i_{D1}$, wherein the response delay time $T_{w1}$ is the sum of the response delay time $T_{w2}$ (not shown), which is the delay time between a rising edge of each pulse of the working pulse signal $V_{p,n}$ and that of a corresponding pulse of the driving pulse signal $V_{g1}$, and the response delay time $T_{w3}$ (not shown), which is the delay time between a falling edge of each pulse of the driving pulse signal $V_{g1}$ and a rising edge of a corresponding pulse of the current $i_{D1}$. And for simpleness, $T_{w3}$ is assumed to be zero.

In FIG. 7, when the input voltage $V_{in}$ is small, the pulse-width duty ratio D of the working pulse signal $V_{p,n}$ is large; that is, the pulse-gap-width duty ratio $D_{nu}$ is small. Thus, a pulse-width of each current pulse of the current $i_{D1}$ is small and consequently the problem of the sampling error appears.

In sum, in a circuit having a switch, when a driving pulse signal of the switch has a small duty ratio or a large duty ratio, how to avoid a sampling error and prevent a produced current distortion becomes the primary motive of the present invention.

SUMMARY OF THE INVENTION

It is therefore an aspect of the present invention to provide a sampling method used for sampling at least a measured signal generating upon switching at least a switch in a circuit. According to a response delay time obtained by a working pulse corresponding to a measured pulse, a switching period, a pulse-width duty ratio, and a predetermined sampling time point, an N is obtained, wherein the N is a natural number greater than 1 and denotes there is a sampling in N successive switching periods. N duty ratios corresponding to N pulses in the magnitude are redistributed and the average of the N duty ratios is equal to the pulse-width duty ratio, whereby a correct sampling time point lies in a duration between a sampling pulse, corresponding to a pulse having the maximum duty ratio, and a predicted pulse, corresponding to the sampling pulse for the measured signal. Thus, when the signal driving the switch has a smaller pulse-width duty ratio, the occurrence of a sampling error can be avoided.

It is therefore another aspect of the present invention to provide a sampling method used for sampling at least a measured signal generating upon switching at least a switch in a circuit. According to a response delay time obtained by a working pulse-gap corresponding to a measured pulse, a switching period, a pulse-gap-width duty ratio converted from a pulse-width duty ratio, and a predetermined sampling time point, an M is obtained, wherein the M is a natural number greater than 1 and denotes there is a sampling in M successive switching periods. M gap duty ratios corresponding to M pulse-gaps in the magnitude are redistributed and the average of the M gap duty ratios is equal to the pulse-gap-width duty ratio, whereby a correct sampling time point lies in a duration between a sampling pulse-gap, corresponding to a pulse-gap having the maximum gap duty ratio, and a predicted pulse, corresponding to the sampling pulse-gap for the measured signal. Thus, when the signal driving the switch has a larger pulse-width duty ratio, the occurrence of a sampling error can be avoided.

BRIEF DESCRIPTION OF THE DRAWINGS

The above objects and advantages of the present invention will become more readily apparent to those ordinarily skilled in the art after reviewing the following detailed descriptions and accompanying drawings, in which.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Firstly, the first sampling method to be described is applied to a circuit when the working pulse signal $V_{p,n}$ has a small pulse-width duty ratio D.

Figure 1:
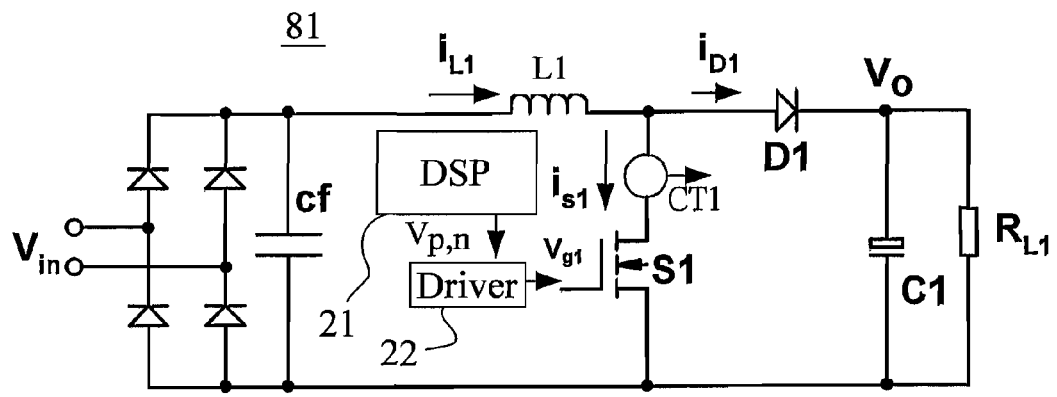
FIG. 1 is a schematic diagram showing a conventional power factor correction circuit for sampling a current with a current transformer.
Figure 2:
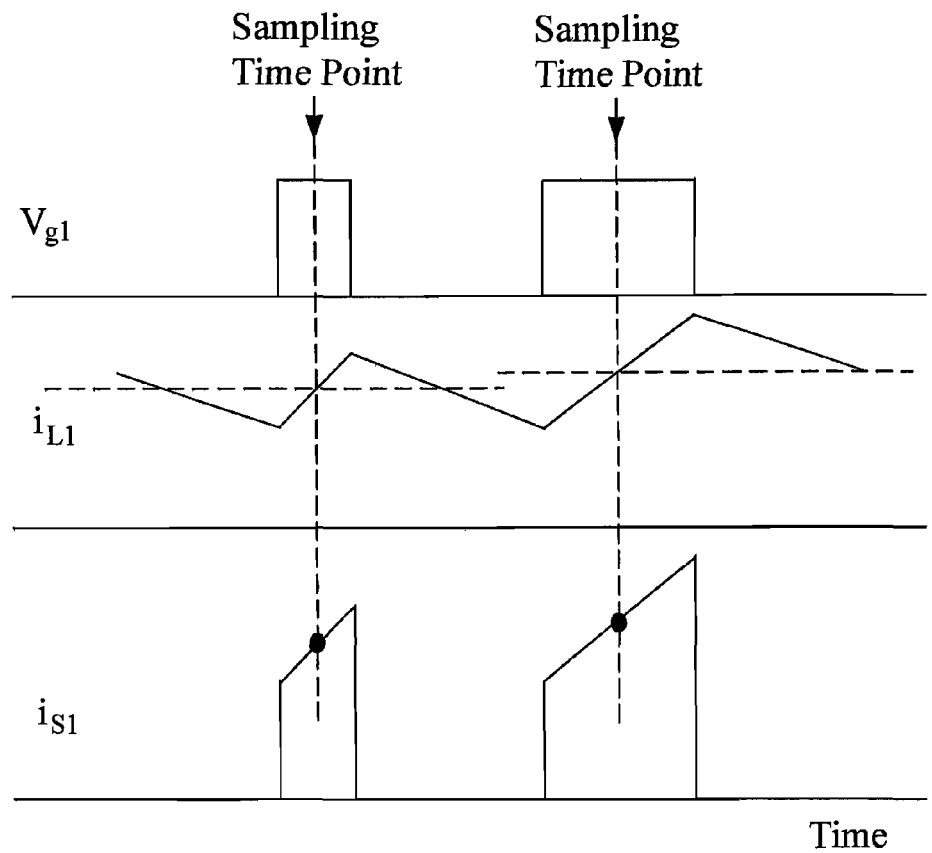
FIG. 2 is a schematic diagram showing waveforms of the circuit in FIG. 1 when sampling a current without response delay.
Figure 3:
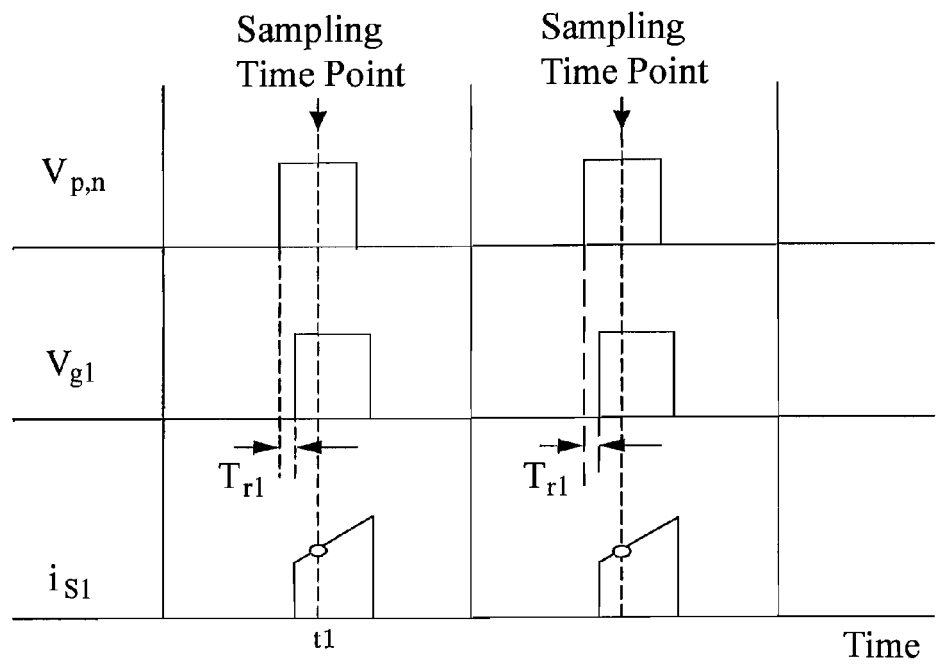
FIG. 3 is a schematic diagram showing waveforms of the circuit in FIG. 1 when sampling a current with response delay.
Figure 4:
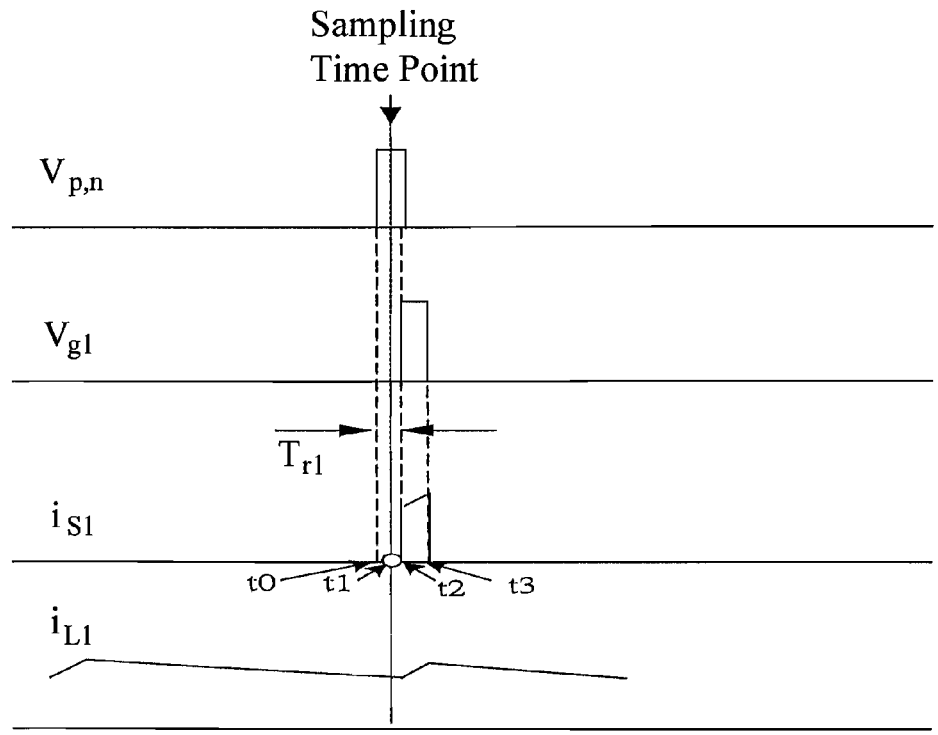
FIG. 4 is a schematic diagram showing waveforms of the circuit in FIG. 1 having sampling errors due to a higher input voltage and a response delay.
Figure 5:
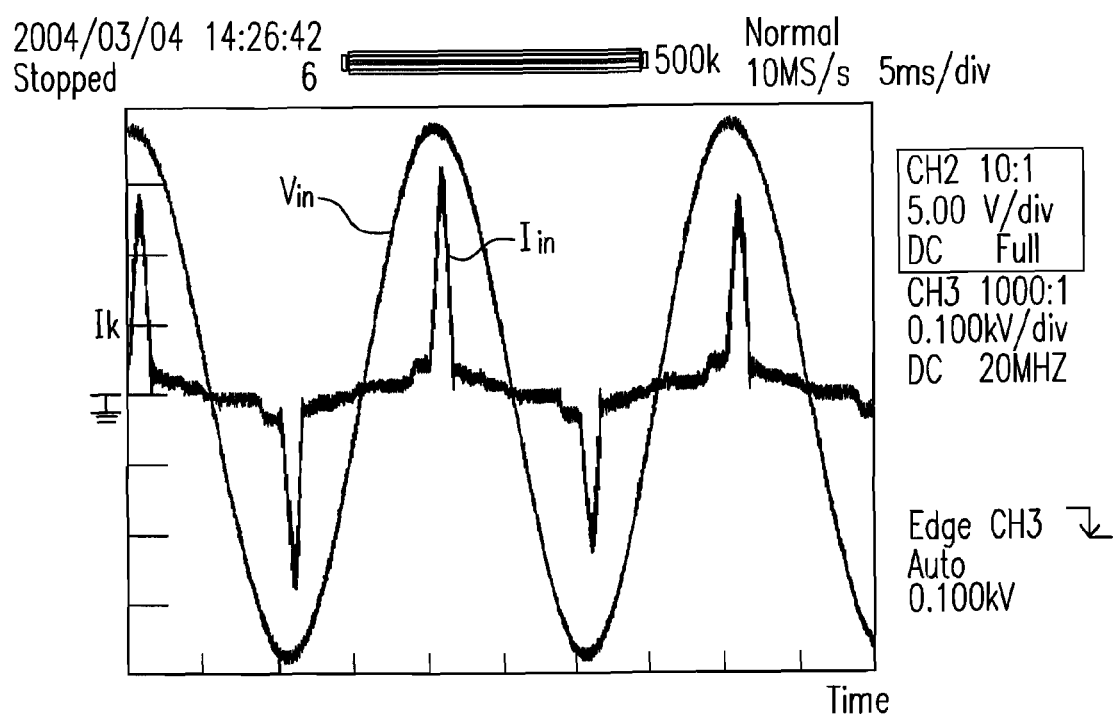
FIG. 5 is a waveform diagram showing waveforms of the circuit in FIG. 1 due to the higher input voltage and the sampling errors.

In general, the switching frequency of the power factor correction circuit 81 in FIG. 1, e.g. several kHz, is much higher than that of the input voltage $V_{in}$, e.g. 50~60 Hz, wherein the switching frequency means the switching frequency of S1 and is the reciprocal of the switching period $T_s$. Therefore, the input voltage $V_{in}$ is almost unchangeable during several successive switching periods, so does the computed pulse-width duty ratio D. Thus, it can still obtain a suitable control effect by calculating D once every k switching period comparing with the prior art that calculating D once per switching period for controlling the circuit, here k is a positive integer. And D is also affected by sampled switch current under average current control method.

Figure 8:
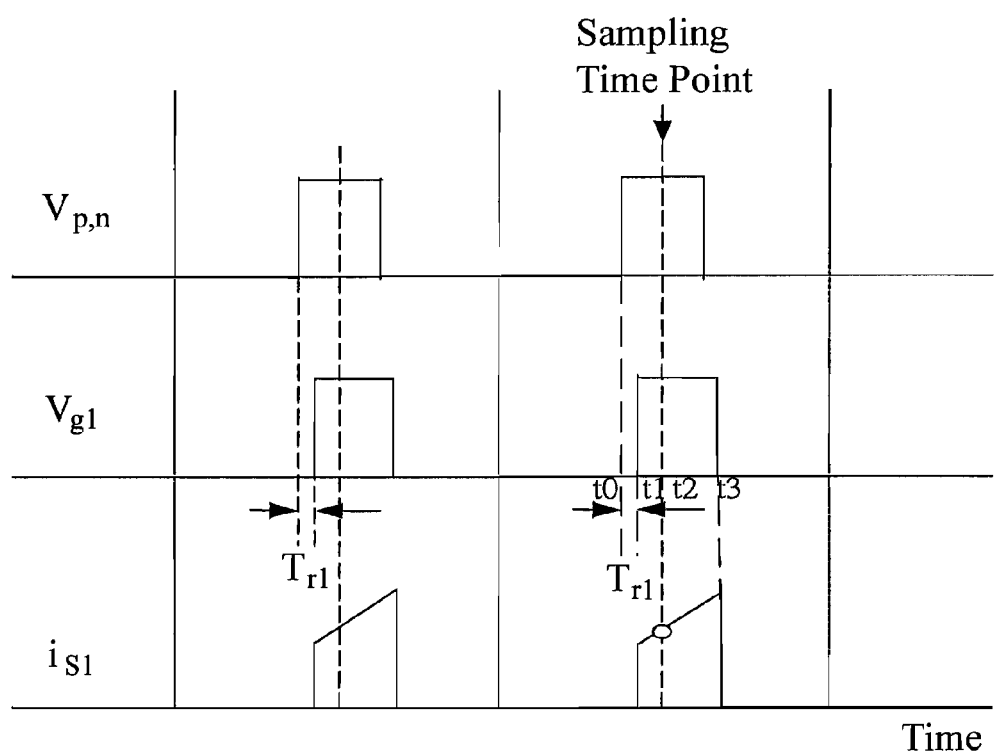
FIG. 8 is a schematic diagram showing waveforms for the first embodiment according to the first sampling method of the present invention.

Please refer to FIG. 8, which shows the corresponding waveforms of the working pulse signal $V_{p,n}$, the driving pulse signal $V_{g1}$, and the current $i_{S1}$ in the circuit 81 in FIG. 1 for the first embodiment according to the first sampling method of the present invention. There is the response delay time $T_{r1}$ between a rising edge of each pulse of $V_{p,n}$ and that of a corresponding pulse of $i_{S1}$.

As shown in FIG. 8, a control strategy is adopted by sampling the switch current and calculating D once every two switching periods. Here the current sampling period or the D calculating period, e.g. two switching periods is defined as an adjusting period. The current sampling time point is set at the midpoint time of the second pulse (or the first pulse on another case) of the two pulses of $V_{p,n}$ in one adjusting period. Surely, an adjusting period can comprise N successive switching periods, wherein the N is a natural number larger than 1. Namely, the current $i_{S1}$ is only sampled at the midpoint time of the nth (n is larger than 1 and less than (N+1)) pulse in one adjusting period for estimating the average current flowing through the inductor L1 during these several switching periods.

According to the response delay time $T_{r1}$, the switching period $T_s$, and a predetermined sampling time point, a threshold duty ratio $D_{cr}$ can be obtained, wherein the following sampling scheme would be used when the duty ratio is smaller than $D_{cr}$. When the predetermined sampling time point is assumed to be at the midpoint time of a sampling pulse, the formula of the threshold duty ratio $D_{cr}$ is $D_{cr}=2T_{r1}/T_s$.

Figure 9:
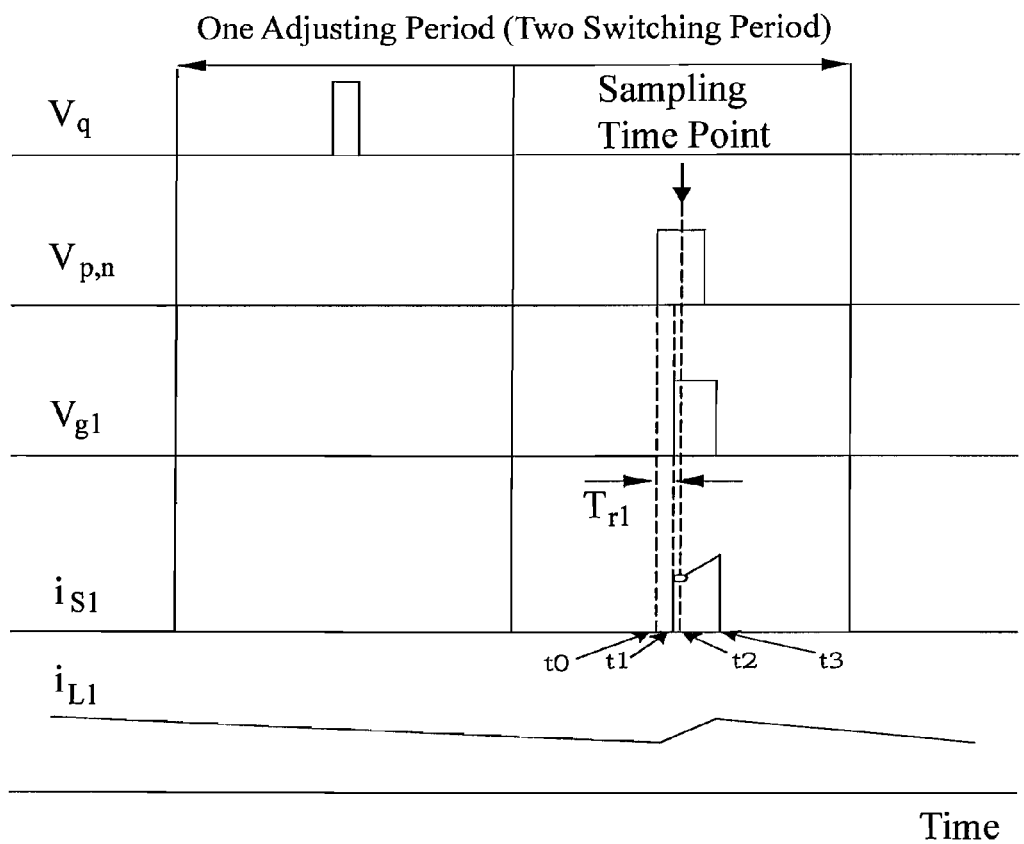
FIG. 9 is a schematic diagram showing waveforms for the second embodiment according to the first sampling method of the present invention.

Afterward, a sampling scheme for avoiding the sampling error in the prior art is detailedly introduced when the sampling time point is assumed to be at the midpoint time of a sampling pulse and the pulse-width duty ratio D is less than the threshold duty ratio $D_{cr}$. Please refer to FIG. 9, which shows the corresponding waveforms of an original working pulse signal $V_q$ with one pulse per switching period, the real working pulse signal $V_{p,n}$ with one pulse per adjusting period, the driving pulse signal $V_{g1}$, the current $i_{S1}$ and $i_{L1}$ in the circuit 81 in FIG. 1 for the second embodiment according to the first sampling method of the present invention. In FIG. 9, an adjusting period comprises two switching periods, and a sampling time point is at the midpoint time of the second pulse (or the first pulse on another case) of the working pulse signal $V_{p,n}$ in one adjusting period. And the first duty ratio $D_1$ corresponding to the first pulse in the adjusting period is set as zero while the second duty ratio $D_2$ corresponding to the second pulse in the adjusting period is set as twice the pulse-width duty ratio D.

In this way, the second pulse provided for sampling can be guaranteed to have a sufficient pulse-width, so that the sampling time point t2 is after the rising edge time t1 of the pulse in the driving pulse signal $V_{g1}$. The sampling error due to the presence of the response delay time $T_{r1}$ can be avoided, and the average duty ratio in one adjusting period (two switching period) can also be guaranteed to be unchangeable with $(0+2D)/2=D$. Thus, the suitable control effect of the power factor correction can be accomplished.

Figure 10:
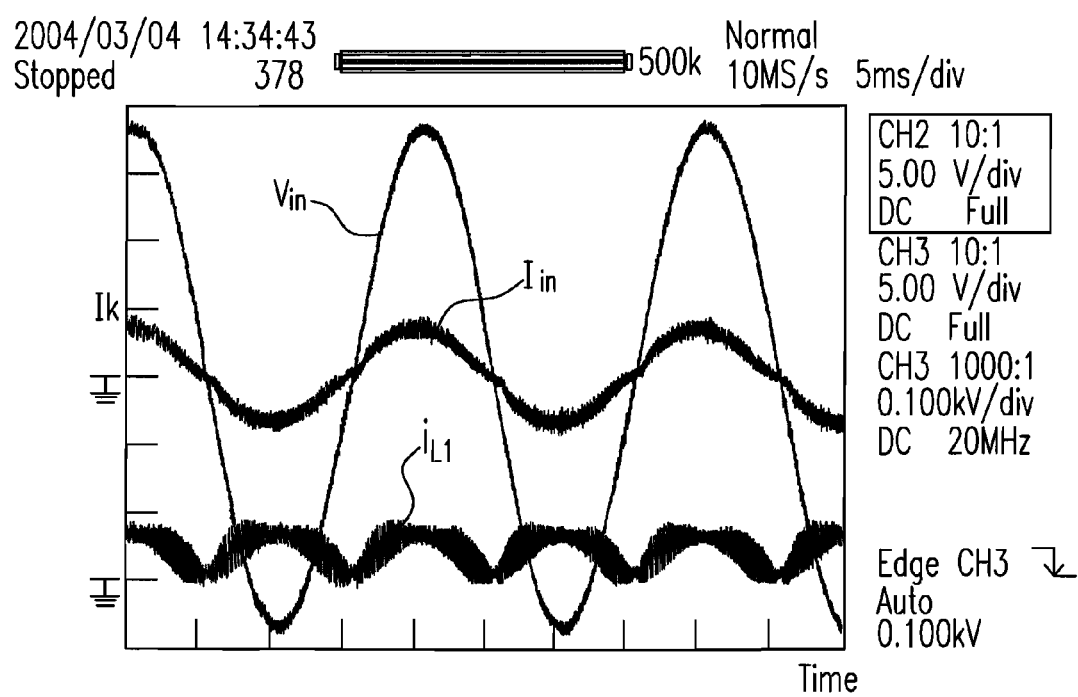
FIG. 10 is a waveform diagram showing waveforms for the first sampling method used in FIG. 9.

Please refer to FIG. 10, which shows the corresponding waveforms of the input voltage $V_{in}$, the input current $I_{in}$ (not shown), and the current $i_{L1}$ in the circuit 81 in FIG. 1 when the first sampling method used in FIG. 9 is adopted. The input current $I_{in}$ is produced by filtering the current $i_{L1}$. Otherwise, the input voltage $V_{in}$ is 265 Vac, the output voltage $V_o$ is 380V, and the output power is 650 W.

Figure 11:
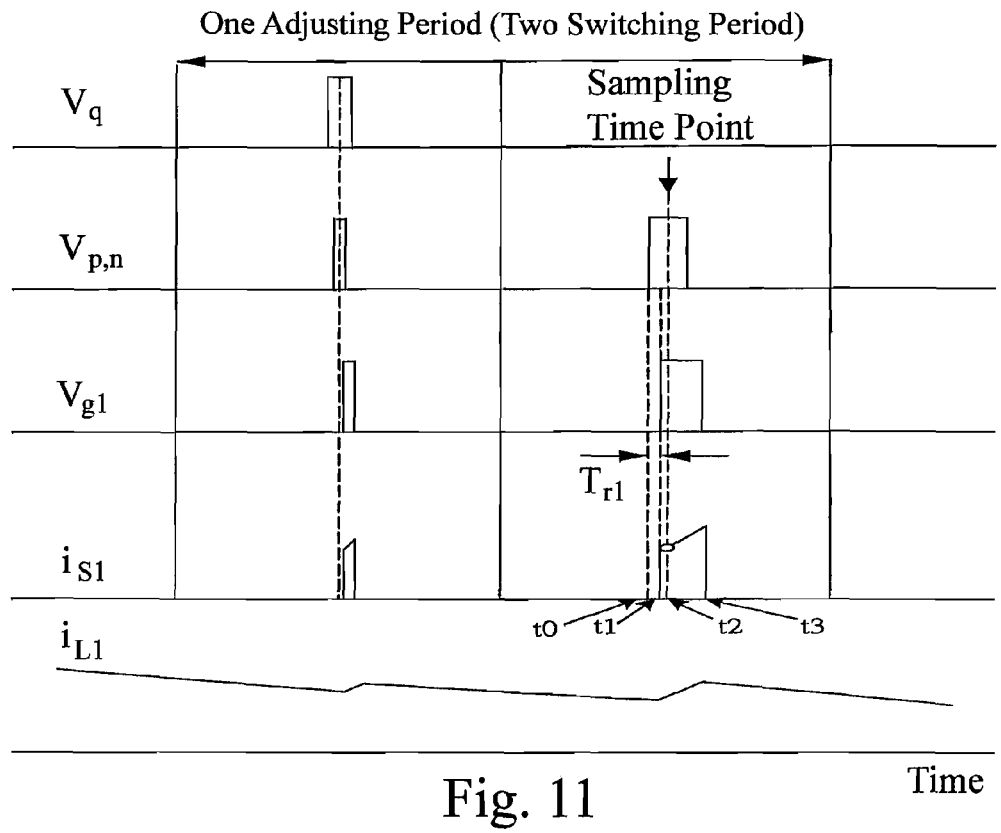
FIG. 11 is a schematic diagram showing waveforms for the third embodiment according to the first sampling method of the present invention.

And in spite of the sampling scheme introduced in FIG. 9, other sampling schemes can also be employed. Please refer to FIG. 11, which shows the corresponding waveforms of an original working pulse signal $V_q$ with one pulse per switching period, the real working pulse signal $V_{p,n}$, the driving pulse signal $V_{g1}$, the current $i_{S1}$ and $i_{L1}$ in the circuit 81 in FIG. 1 for the third embodiment according to the first sampling method of the present invention. As shown in FIG. 11, an adjusting period comprises two switching periods, and a sampling time point is at the midpoint time of the second pulse (or the first pulse on another case) of the working pulse signal $V_{p,n}$.

Suppose that the sampling time point is at the midpoint time of the sampling pulse. The suitable control effect can be accomplished as long as the first duty ratio $D_1$ corresponding to the first pulse in the first switching period and the second duty ratio $D_2$ corresponding to the second pulse in the second switching period satisfy the following conditions:

$$D_1+D_2=2D$$

$$D_iT_s/2 \geq T_{r1}$$

wherein the D is the original pulse-width duty ratio of $V_q$. The $D_1$ and the $D_2$ are rational numbers. The i is a natural number and $i \leq 2$. The $D_i$ is the larger number between the $D_1$ and the $D_2$. And as an example shown in FIG. 11, $D_1$=0.5D, $D_2$=1.5D. And the minimum D when an adjusting period comprises two switches periods is $D_{min}$ is $D_{min}=T_{r1}/T_s$.

When the input voltage $V_{in}$ is higher, the required pulse-width duty ratio D of the working pulse signal $V_{p,n}$ is smaller. When D is smaller than $D_{min}$, though the aforementioned sampling scheme is employed, the second (first) duty ratio $D_2$ ($D_1$) corresponding to the second (first) pulse is still insufficient in the magnitude, so that the sampling time point is ahead of the leading edge of the sampled current pulse. At this time, another scheme is adopted with one adjusting period comprises N successive switching periods, wherein the N is a positive integer greater than 2. Under this sampling scheme, suppose that the first duty ratio corresponding to the first pulse in the first switching period is $D_1$, and the second duty ratio corresponding to the second pulse in the second switching period is $D_2$, . . . and the Nth duty ratio corresponding to the Nth pulse in the Nth switching period is $D_N$. Further suppose that the sampling time point is at the midpoint time of the sampling pulse. The suitable control effect can be accomplished as long as the $D_1$, $D_2$, . . . and $D_N$ satisfy the following conditions:

$$D_1+D_2+\ldots+D_N=ND$$

$$D_iT_s/2 \geq T_{r1}$$

wherein the D is the pulse-width duty ratio. The $D_1$, $D_2$, . . . and $D_N$ are rational numbers. And i is a natural number and $i \leq N$; $D_i$ is one duty ratio among the $D_1$, $D_2$, . . . and $D_N$.

Thus the minimum duty ratio $D_{min}$ when an adjusting period comprises N switching periods is determined by the following formula:

$$ND_{min}T_s/2 \geq T_{r1}$$

Here, a scheme is introduced for determining the value of the N. When the pulse-width duty ratio D is less than the threshold duty ratio $D_{cr}$, then according to the computing formula $ND_{min}T_s/2 \geq T_{r1}$ with $D_{min}=D$, thus a minimum value $N_{min}$ of the N can be obtained and satisfies the relation of $N_{min}=\text{Ceil}(2T_{r1}/(DT_s))$, wherein Ceil(x) is a minimum integer not less than x, and the $N_{min}$ are natural numbers greater than 1. Then, according to the design requirement, N is set as an integer not less than $N_{min}$, and the widest pulse corresponding to a maximum duty ratio $D_i$ is set as the sampling pulse, wherein at least one duty ratio $D_i$ satisfies the relation of $D_iT_s/2 \geq T_{r1}$.

In the foregoing description, each pulse of the current $i_{S1}$ is sampled at the midpoint time of the corresponding sampling pulse in the working pulse signal $V_{p,n}$. If the sampling time point is not at the midpoint time of the sampling pulse and is at any other time point, it is all right as long as the sampling time point is guaranteed to be in the pulse-width of the current $i_{S1}$. When the sampling error occurs, the method describing above can also be used.

Figure 12:
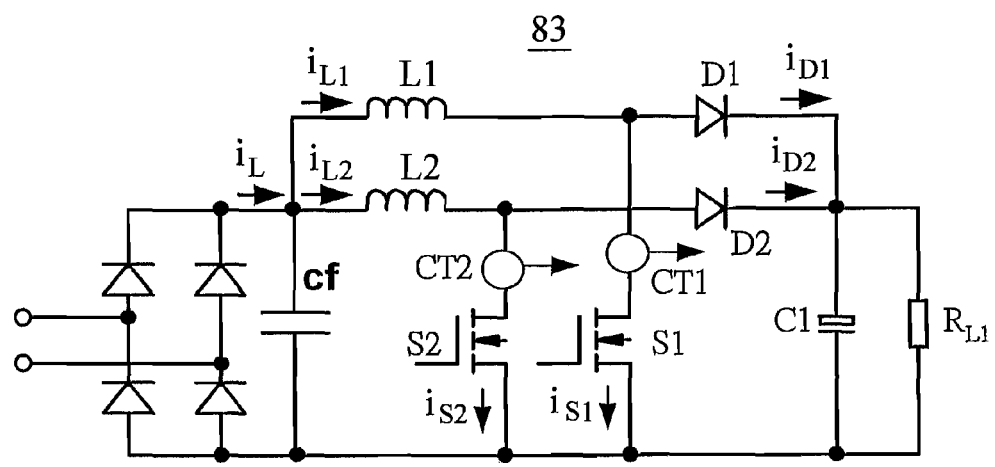
FIG. 12 is a schematic diagram showing an interleaving power factor correction system for the first sampling method of the present invention.

Please refer to FIG. 12, which shows an interleaving power factor correction system for the first sampling method of the present invention. The circuit 83 in FIG. 12 is an expanded circuit of the circuit 81 in FIG. 1 and shows a switch S1, a switch S2, a diode D1, a diode D2, an inductor L1, and an inductor L2. A current transformer CT1 is connected in series with the switch S1, and a current transformer CT2 is connected in series with the switch S2. When at least a duty ratio for the current $i_{S1}$ flowing through the switch S1 and the current $i_{S2}$ flowing through the switch S2 is too small like the aforementioned, the problem of the sampling error will take place. The above sampling method can be adopted.

Figure 13:
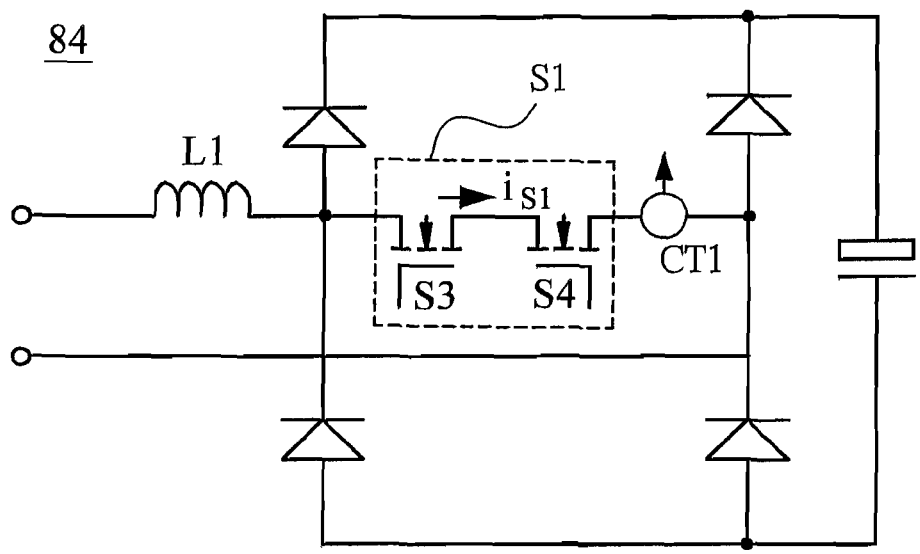
FIG. 13 is a schematic diagram showing a H power factor correction circuit for the first sampling method of the present invention.

And FIG. 13 shows an H power factor correction circuit (HPFC) which can also uses the aforementioned sampling method of the present invention. The circuit 84 in FIG. 13 includes two series switches S3 and S4, and an inductor L1. A current transformer CT1 is connected in series with the switches S3 and S4. When the duty ratio of switches S3 and S4 is too small like the aforementioned, the problem of the sampling error takes place. Then the aforementioned sampling method can be employed.

Figure 14:
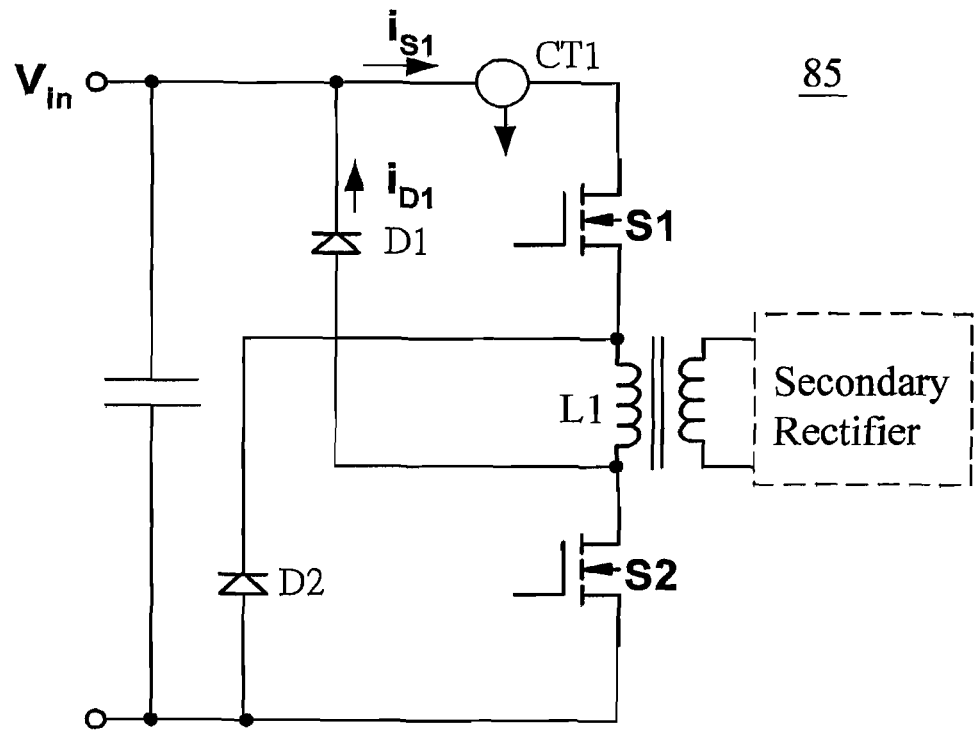
FIG. 14 is a schematic diagram showing a circuit of a DC-DC converter for the first sampling method of the present invention.

Although the aforementioned embodiments all refer to the power factor correction circuits, the present invention may also be applicable to other types of circuits. FIG. 14 shows a circuit of a DC-DC converter which can adopted the aforementioned sampling method of the present invention. The circuit 85 in FIG. 14 is a dual switch forward with PWM control. A current transformer CT1 is connected in series with a switch S1 for sampling the midpoint current of the pulse flowing through the switch S1, so that the average current flowing through the primary coil L1 of the transformer is gotten. When the duty ratio is too small like the aforementioned, the problem of the sampling error takes place. Then the above-mentioned sampling method can be employed.

Figure 6:
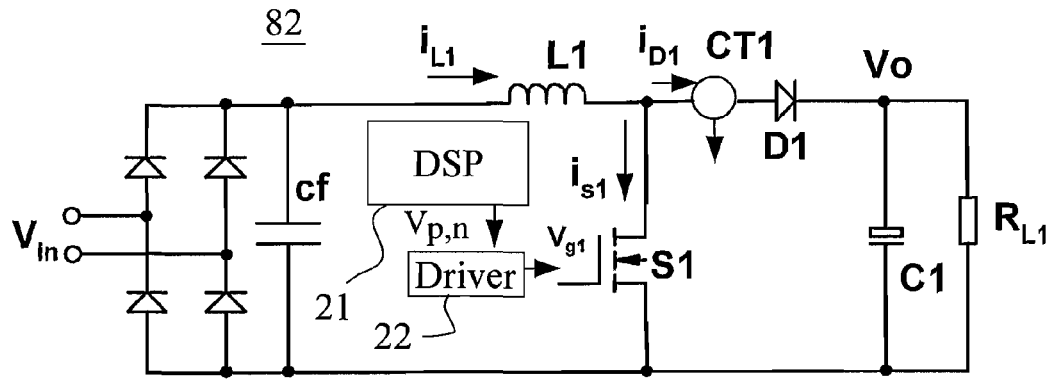
FIG. 6 is a schematic diagram showing another conventional power factor correction circuit for sampling a current with a current transformer.
Figure 7:
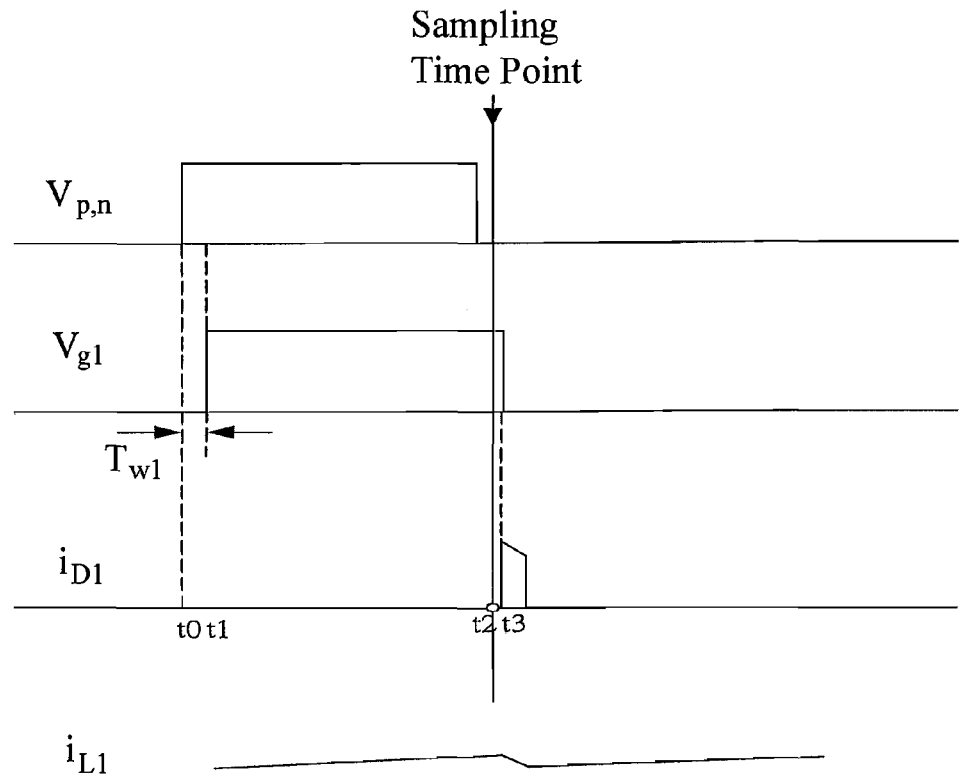
FIG. 7 is a schematic diagram showing conventional waveforms having sampling errors due to a lower input voltage and response delay.

Referring to the descriptions relevant to FIG. 6 and FIG. 7 in the prior arts, CT1 is connected with the diodes and samples the diode's current. Thus the aforementioned sampling error occurs when the duty ratio D of the switches is large enough that is the pulse-gap-width duty ratio $D_{nu}$ is small than a threshold. Thus, a second sampling method is described as follows.

Please refer to FIG. 6 again, which is also a schematic diagram showing the power factor correction circuit adopting the second sampling method of the present invention.

And as mentioned above, the pulse-gap-width duty ratio $D_{nu}$ is $D_{nu}=V_{in}/V_o$ which is complementary with D and denotes the ratio of the pulse duration of the current $i_{D1}$ to the switching period $T_s$ of the switch S1.

There is a correlation between the first sampling method and the second sampling method that the current $i_{D1}$, the response delay time $T_{w1}$, the response delay time $T_{w2}$, the response delay time $T_{w3}$, the pulse-gap-width duty ratio $D_{nu}$, the threshold gap duty ratio $D_{cr,nu}$, the value of the M and the sampling pulse-gap in the second sampling method respectively correspond to the current $i_{S1}$, the response delay time $T_{r1}$, the response delay time $T_{r2}$, the response delay time $T_{r3}$, the pulse-width duty ratio D, the threshold duty ratio $D_{cr}$, the value of the N and the sampling pulse in the first sampling method.

Afterward, the second sampling method is introduced with the fourth embodiment (not shown). An adjusting period is composed of two switching periods in the working pulse signal $V_{p,n}$ for the fourth embodiment. There is a pulse-gap in each switching period $T_s$. The sampling time point is at the midpoint time of the second pulse-gap (or the first pulse-gap on another case) of the two pulse-gaps and serve as the time sampling the current $i_{D1}$. Similarly, the adjusting period can also comprise M successive switching periods with sampling the current $i_{D1}$ in one switching period of M, wherein M is a natural number greater than 1. And the current $i_{D1}$ can be sampled at the midpoint time of the nth (n is larger than 1 and less than (M+1)) pulse-gap in one adjusting period for estimating the average current flowing through the inductor L1 in that adjusting period.

According to the response delay time $T_{w1}$, the switching period $T_s$, and a predetermined sampling time point, a threshold gap duty ratio $D_{cr,nu}$ can be obtained. When the predetermined sampling time point is assumed to be at the midpoint time of the sampling pulse, the formula of the threshold gap duty ratio $D_{cr,nu}$ is $D_{cr,nu}=2T_{w1}/T_s$. When the pulse-gap-width duty ratio $D_{nu}$ is smaller than the threshold gap duty ratio $D_{cr,nu}$, the value of the M being a natural number greater than 1 is determined, and M successive switching periods are arranged as an adjusting period for a sampling. Gap duty ratios from the first gap duty ratio $D_{1,nu}$ to the Mth duty ratio $D_{M,nu}$ respectively corresponds to M pulse-gaps from the first pulse-gap to the Mth pulse-gap, and one of the M pulse-gaps is set as the sampling pulse-gap.

Afterward, a sampling scheme to avoid the sampling error in the prior art is detailed introduced with the fifth embodiment (not shown) when the pulse-gap-width duty ratio $D_{nu}$ is too small. In the fifth embodiment, an adjusting period comprises two switching periods, and a sampling time point is at the midpoint time of the second pulse-gap (or the first pulse-gap on another case) of the working pulse-gap signal $V_{p,nu}$. And the suitable control effect can be accomplished as long as the first gap duty ratio $D_{1,nu}$ and the second gap duty ratio $D_{2,nu}$ satisfy the following conditions:

$$D_{1,nu}+D_{2,nu}=2D_{nu}$$

$$D_{i,nu}T_s/2 \geqq T_{w1}$$

wherein the $D_{nu}$ is the pulse-gap-width duty ratio. The $D_{1,nu}$ and the $D_{2,nu}$ are rational numbers. The i is a natural number and $i \leqq 2$. The $D_{i,nu}$ is one pulse-width duty ratio between the $D_{1,nu}$ and the $D_{2,nu}$. As two examples, $D_{1,nu}=0$, $D_{2,nu}=2D_{nu}$; $D_{1,nu}=0.5$ $D_{nu}$, $D_{2,nu}=1.5D_{nu}$. The sampling time point is set at the midpoint time of the larger pulse-gap.

When the input voltage $V_{in}$ is much more lower then the required pulse-gap-width duty ratio $D_{nu}$ of the working pulse signal $V_{p,n}$ is much more smaller, if $D_{nu}$ is smaller than $D_{min}$, $nu=T_{w1}/T_s$, though the aforementioned sampling scheme is employed, the larger gap duty ratio $D_{i,nu}$ (i=1, 2) is still insufficient in the magnitude so that the sampling error described above still occurs At this time, a method where there is a current sampling in M successive switching periods can be employed, wherein the M is a natural number greater than 2. Under this sampling scheme, suppose that the first gap duty ratio corresponding to the first pulse-gap in the first switching period is a $D_{1,nu}$, and the second gap duty ratio corresponding to the second pulse-gap in the second switching period is $D_{2,nu}$, . . . and the Mth gap duty ratio corresponding to the Mth pulse-gap in the Mth switching period is $D_{M,nu}$. Further suppose that the sampling time point is at the midpoint time of the sampling pulse-gap. The suitable control effect can be accomplished as long as the $D_{1,nu}$, $D_{2,nu}$, . . . and $D_{M,nu}$ satisfy the following conditions:

$$D_{1,nu}+D_{2,nu}+ \ldots +D_{M,nu}=MD_{nu}$$

$$D_{i,nu}T_s/2 \geqq T_{w1}$$

wherein the $D_{nu}$ is the pulse-width duty ratio. The $D_{1,nu}$, $D_{2,nu}$, . . . and $D_{M,nu}$ are rational numbers. The i is a natural number and $i \leqq M$. The $D_i$ is one pulse-width duty ratio the $D_{1,nu}$, $D_{2,nu}$, . . . and $D_{M,nu}$.

At this time, a minimum gap duty ratio $D_{min,nu}$ is determined by the following formula:

$$MD_{min,nu}T_s/2 \geqq T_{w1}$$

Afterward, a scheme is introduced for determining the value of the M in order that there is a sampling in M successive switching periods. When the pulse-gap-width duty ratio $D_{nu}$ is less than the threshold gap duty ratio $D_{cr,nu}$, according to the computing formula $MD_{min,nu}T_s/2 \geqq T_{w1}$ for the minimum gap duty ratio $D_{min,nu}$, a minimum value $M_{min}$ of the M can be obtained and satisfies the relation of $M_{min,nu}$=Ceil $(2T_{w1}/(D_{nu}T_s))$, wherein Ceil(x) is a minimum integer not less than x, and the M and the $M_{min}$ are natural numbers greater than 1. Then, according to the design requirement, the required value of the M is determined from effective values of the M, and the widest pulse-gap corresponding to a maximum gap duty ratio $D_{i,nu}$ is set as the sampling pulse-gap, wherein at least one pulse-width duty ratio $D_{i,nu}$ should satisfy the relation of $D_{i,nu}T_s/2 \geqq T_{w1}$.

In the foregoing description, the each pulse of the current $i_{D1}$ is sampled at the midpoint time of the sampling pulse-gap in the working pulse signal $V_{p,n}$. If the sampling time point is not at the midpoint time of the sampling pulse-gap and is at any other time point, it is all right as long as the sampling time point is guaranteed to be in the pulse-width of the current $i_{D1}$. When the problem of sampling error due to the narrow pulse-gap-width of the sampling pulse-gap occurs, the solving method describing above can also be used. For example, in M successive switching periods of an adjusting period, M pulses, wherein at most (M−1) pulses can have a zero pulse-gap-width, are produced, and a sampling pulse-gap being one of the M pulse-gaps has a sufficient pulse-gap-width. Therefore, the sampling time point lies in the pulse-width of the current $i_{D1}$, and the average gap duty ratio of the M pulses is assured to be equal to the original pulse-gap-width duty ratio $D_{nu}$.

Figure 15:
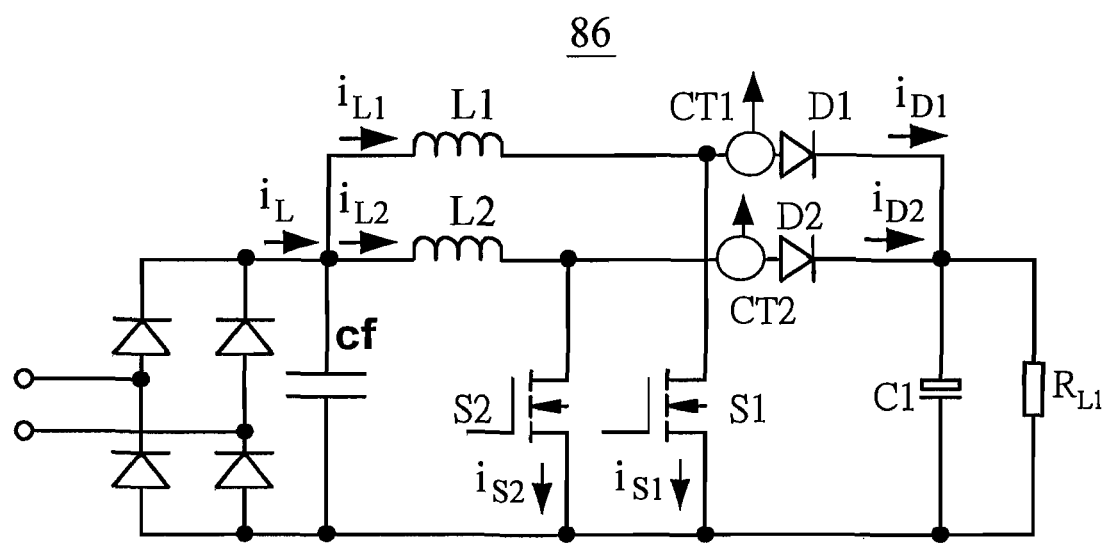
FIG. 15 is a schematic diagram showing an interleaving power factor correction system for the second sampling method of the present invention.

FIG. 15 shows an interleaving power factor correction system for the second sampling method of the present invention. The circuit 86 in FIG. 15 is a variation of the circuit 83 in FIG. 12 and shows two switches S1 and S2, two diodes D1 and D2 and two inductors L1 and L2. A current transformer CT1 is connected in series with the first diode D1, and a current transformer CT2 is connected in series with the second diode D2. When a duty ratio for a current $i_{D1}$ flowing through the diode D1 and a current $i_{D2}$ flowing through the diode D2 is too small like the aforementioned, the problem of the sampling error will take place. The second sampling method with adjusting duty ratios can be employed. Certainly, the second sampling method can also be applicable to other circuit architecture such as a DC-DC converting circuit.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A sampling method used for sampling a measured signal related to a switch in a converter circuit, comprising steps of:
    (a) providing a first working pulse signal which has a pulse-width duty ratio D in a switching period $T_s$;
    (b) setting a first adjusting period comprising first N successive switching periods of the first working pulse signal with at least a pulse duty ratio of the first working pulse signal in the first adjusting period is D, wherein N is a natural number larger than 1;
    (c) providing a second working pulse signal which has second N successive switching periods corresponding to the first N successive switching periods with their pulse-width duty ratio $D_1, D_2, \ldots, D_N$ respectively to drive the switch in the converter circuit and generating the measured signal, wherein the sum of $D_1, D_2, \ldots, D_N$ substantially equals to N·D and the second N successive switching periods constitute a second adjusting period;
    (d) setting one pulse of the second working pulse signal in the second adjusting period as a sampling pulse; and
    (e) sampling the measured signal at a predetermined sampling time point in the sampling pulse for producing a sampling value of the converter circuit.

2. A sampling method according to claim 1, further comprising a step of:
    setting the predetermined sampling time point at a midpoint time of the sampling pulse.

3. A sampling method according to claim 2, wherein a falling edge of a pulse of the second working pulse signal and a rising edge of a corresponding pulse of the measured signal have a response delay time $T_r$, N is a natural number larger than $\text{Ceil}(2 \cdot T_r/(D \cdot T_s))$ and the pulse width duty ratio of the sampling pulse is larger than $2 \cdot T_r/T_s$.

4. A sampling method according to claim 2, wherein $D_1 = D_2 = \ldots = D_{N-1} = 0$, $D_N = N \cdot D$.

5. A sampling method according to claim 2, wherein N=2, $D_1 + D_2 = 2 \cdot D$.

6. A sampling method according to claim 5, wherein $D_1 = 0$, $D_2 = 2 \cdot D$.

7. A sampling method according to claim 5, wherein $D_1 = 2 \cdot D$, $D_2 = 0$.

8. A sampling method according to claim 5, wherein $D_1 = 0.5 \cdot D$, $D_2 = 1.5 \cdot D$.

9. A sampling method according to claim 1, wherein the converter circuit is a PFC circuit, which comprises an inductor, an MOSFET switch and a diode connected as a Y connection.

10. A sampling method according to claim 9, wherein the switch of the converter circuit is the MOSFET switch and the measured signal is a current flowing through the MOSFET switch.

11. A sampling method according to claim 9, wherein the switch of the converter circuit is the diode and the measured signal is a current flowing through the diode.

12. A sampling method according to claim 1, wherein the converter circuit is an interleaving PFC circuit, which comprises two inductors, two MOSFET switches and two diodes connected as two Y connections.

13. A sampling method according to claim 12, wherein the switch of the converter circuit is the two MOSFET switches and the measured signal is a current flowing through the two MOSFET switches.

14. A sampling method according to claim 12, wherein the switch of the converter circuit is the two diodes and the measured signal is a current flowing through the two diodes.

15. A sampling method according to claim 1, wherein the converter circuit is a dual-switch forward circuit which comprises two switches connected in series with a primary side of a transformer, the switch of the converter circuit is one of the two switches, and the measured signal is a current flowing through the two switches.

16. A sampling method according to claim 1, wherein the sampling pulse has a maximum duty ratio of the N pulses.

\* \* \* \* \*